SEMICONDUCTOR SWITCH

Filed Nov. 26, 1963

INVENTORS:
FINIS E. GENTRY,
BERNARD R. TUFT,
BY Urban H. Faubion
THEIR ATTORNEY.

United States Patent Office 3,284,680
Patented Nov. 8, 1966

3,284,680
SEMICONDUCTOR SWITCH

Finis E. Gentry and Bernard R. Tuft, Skaneateles, N.Y., assignors to General Electric Company, a corporation of New York Filed Nov. 26, 1963, Ser. No. 326,162
3 Claims. (Cl. 317—235)

The present invention relates to semiconductor switches and, in particular, to improvements in such devices.

Semiconductor switches have become an important component in a wide variety of control applications, particularly PNPN three terminal devices of the type frequently referred to as silicon controlled rectifiers (SCR). Operation of such devices is described in Chapter 1 of the General Electric Controlled Rectifier Manual, second edition, copyright 1961 by the General Electric Company, the article by Moll, Tanenbaum, Goldey and Holonyak in Proceedings of the IRE, September 1956, volume 44, pages 1174 to 1182, and in the copending patent application, Serial Number 838,504, entitled Semiconductor Devices and Methods of Making Same, filed September 8, 1959 in the name of Nick Holonyak, Jr., and Richard W. Aldrich and assigned to the assignee of the present application. The semiconductor switch is made an active element in the circuit by connecting two of its three terminals (its anode and cathode terminals) in the circuit to be controlled. With the switch in its "off" condition, the rectifier acts as a high impedance element. Except for a very small leakage current, the switch acts as an open circuit. When the switch is in its "on" condition, it presents a very low impedance device (essentially a short circuit).

The usual mechanism for rendering the PNPN switches conductive is to introduce current into a third lead or terminal (called the gate lead) which increases the current flowing through the device and thereby renders the device conductive. This action is descriptively referred to as triggering the device or turning it on. When the device is triggered into the high conduction mode, the most common method of turning the device off is to reduce the current between the device anode and cathode (the main conduction path) below a given level called the holding current level.

Commercial SCR structures are generally rendered conductive (turned on) by applying a voltage to the gate lead which is positive relative to the device cathode (where the cathode is connected to an external N type emitter layer of the semiconductor body and is negative relative to the anode). There are, however, many circuit applications where it is desirable to have a complementary structure. That is, a switch which is turned on by a voltage between the anode and gate. Preferably, a voltage which is of small magnitude and of negative polarity relative to the applied anode voltage.

One embodiment of the present invention specifically meets this need. The complementary structure of this embodiment provides a device which is turned on by the same type signal as that used for the usual SCR. When the term "complementary structure" (or dual) is used here, it means a structure which is generally the same but has regions of N conductivity type replacing regions of P type and regions of P conductivity type replacing regions of N type.

Other devices can be built which can be triggered with a signal between anode and gate terminals, e.g. by using a structure which is complementary to (the dual of) conventional SCR's and by using a junction gate structure described in the copending patent application of Joseph Moyson, Serial Number 35,336 entitled Semiconductor Devices and Methods of Making Same, filed June 10, 1960 and assigned to the assignee of the present invention. However, these devices require completely different processes (diffusion or alloy) from those used for the normal production of the conventional SCR and, hence, different production runs. The present invention allows maximum simultaneous use of production facilities for production of units which can be fired both ways since the device of the present invention requires only a few slight modifications of production processes for conventional SCR's.

In carrying out the present invention, a body of semiconductor material is used. The body has four layers of opposite conductivity type interleaved to form three pn junctions between the major faces of the body. Electrodes which make low resistance ohmic contact to opposite terminal layers are provided so that a main current path exists between these electrodes and through the four layers. A region of one conductivity type is formed in a terminal layer of the opposite conductivity type and is provided with a low resistance ohmic contact which permits application of a gating signal to the device.

The features which are believed to be characteristic of the invention are set forth with particularity in the appended claims. The invention itself, however, both as to its organization and advantages thereof may best be understood by reference to the following description taken in connection with the accompanying drawings in which:

Figure 1:
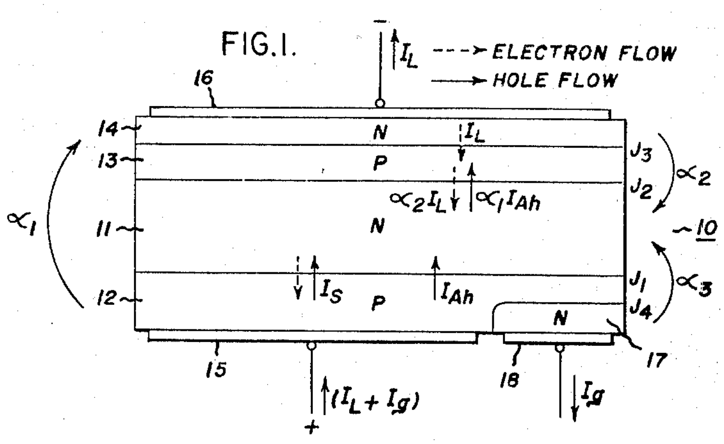
FIGURE 1 is a diagrammatic sectional view of a remote gate device constructed in accordance with the principles of this invention showing symbols used in explaining the device turn on mechanism.

One embodiment of a practical device constructed in accordance with the invention is illustrated somewhat schematically in FIGURE 1. As illustrated, the device includes a four layer PNPN semiconductor pellet, 10, which has an internal N conductivity type base region or layer 11 and P conductivity type regions or layers 12 and 13 on opposite sides. The lower (i.e. lower in the figure) P type layer 12 is considered the lower or first emitter and the junction $J_1$ between the lower P type layer 12 and internal N type layer 11 is considered the first emitter junction. The upper (internal) P type region 13 constitutes a base region which is separated from the N type base region by center junction $J_2$. An upper N conductivity type emitter region or layer 14 is formed contiguous with the internal P type base layer 13 and is separated therefrom by a second emitter junction $J_3$.

In order to provide a working switch an ohmic contact 15 is applied on the lower major face of P type emitter region 12 to provide an anode connection, an ohmic connection 16 is applied on the upper (opposite) major face of the pellet 10; i.e. to the upper N type emitter region 14 to provide a device cathode connection. In order to provide a means to trigger the device into conduction, an N type gate region 17 is provided in the lower P type emitter region 12 and the device gate connection is made to an ohmic contact 18 on the gate region. Formation of the N type gate region 17 in lower P type emitter region provides a rectifying junction $J_4$ therebetween. This gate region 17, in effect, forms a transistor with P type emitter region 12 and N type base region 11 which includes junction $J_4$ and $J_1$. The anode contact 15 and cathode contact 16 derive their names from vacuum tube terminology, that is, they are normally connected to the positive and negative voltage sources respectively. The gate contact 18 is so called because it is the medium through which the device is turned on. Further, since the N type gate region acts as a separate emitter, it is called a remote gate.

In order to understand how the device of FIGURE 1 operates, consider the PNPN pellet 10 with a positive potential at the anode contact 15 (P type end layer 12) and a negative potential at the cathode contact (N type end layer 14) in the light of this discussion. It is seen that the emitter junctions $J_1$ and $J_3$ between the two outer end layers (at both ends) tend to conduct whereas the center junction, $J_2$, between the N and P type base layers 11 and 13 tends to block current flow through the device. That is, the device is in its blocking state. The PNPN device is made to conduct by raising the voltage across it to some high value which forces conduction across the center junction $J_2$. It may also be made to conduct by biasing the contact 18 negatively with respect to the anode contact 15, thus causing a change of the charge condition across the center junction $J_2$.

To expand a little on the operation, when the gate contact 18 is biased negative relative to anode contact 15, the N type gate region 17 acts as an emitter and injects electrons into the adjacent P type region 12. These electrons diffuse toward the adjacent junction $J_1$. The space charge layer of the junction $J_1$ is adequate for collection of minority carriers. Thus, the injected electrons are collected at junction $J_1$, and lower the potential of the internal N type base layer 11 relative to the external P type emitter layer 12 causing emitter 12 to inject holes into base layer 11. This, in turn, causes, by the same process, a change of the reverse or blocking bias across center junction $J_2$ to forward bias and the device conducts as a conventional SCR. In other words, the net result is much the same as if a gate lead were attached directly to the internal N type base layer 11 and a negative bias (negative relative to anode contact 15) applied directly to it. However, on a normal SCR which is reverse biased the lower emitter junction $J_1$ is blocking; thus, the gate would be at a high potential during this period. With the remote gate structure just described the voltage applied to the internal N type base region 11 during the reverse half cycle does not appear on the gate terminal.

A better understanding of the device operation may be had by considering the internal and external currents. In equation form:

$$I_L = \alpha_1 I_{Ah} + \alpha I_L + I_S \quad (1)$$

where $I_L$ is load current (see FIGURE 1), $I_S$ is current across center junction $J_2$ when in forward bias (thermally generated current), $\alpha_1$ is the fraction of the current at lower emitter junction $J_1$ which is collected at the center junction $J_2$ and thus the current gain for the PNP transistor portion including lower P type emitter 12, $\alpha_2$ is the fraction of the current at the upper emitter junction $J_3$ which is collected at the center junction $J_2$ and thus current gain for the NPN transistor portion including upper N type emitter layer 14, and $I_{Ah}$ is the device anode current less the base current to drive the transistor including gate emitter junction $J_4$; that is $$I_{Ah} = I_L + I_g - (1-\alpha_3) I_g \quad (2)$$

where $\alpha_3$ is the fraction of current at the gate emitter junction $J_4$ which is collected at top emitter junction $J_1$ and $I_g$ is gate current.

$$\therefore I_{Ah} = I_L + \alpha_3 I_g \quad (3)$$

Substituting Equation 3 in Equation 1

$$I_L = I_S + \alpha_1 (I_L + \alpha_3 I_g) + \alpha_2 I_L$$

$$I_L = \frac{\alpha_1 \alpha_3 I_g + I_S}{1 - \alpha_1 - \alpha_2}$$

Thus, the device turns on when the sum $\alpha_1 + \alpha_2 \rightarrow 1$. This is the same as for a conventional SCR and occurs as a result of an increase in current density across the two outer emitter junctions $J_1$ and $J_3$ due to an increase in gate current.

Figure 2:
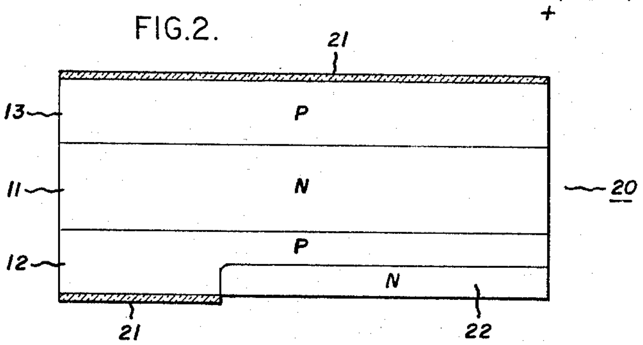
FIGURE 2 is a diagrammatic sectional view of a semiconductor pellet which ultimately forms one conventional SCR pellet and is used in comparing methods of producing an SCR pellet and a pellet for a device of this invention.
Figure 3:
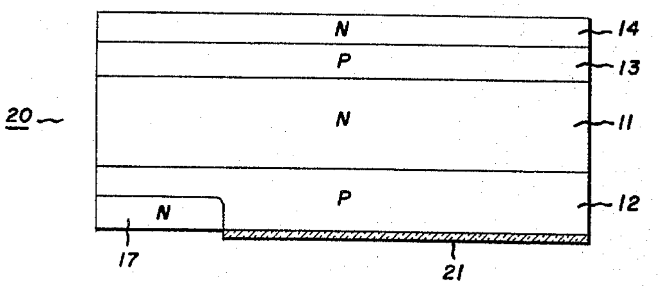
FIGURE 3 is a diagrammatic sectional view of a semiconductor pellet which culminates in the structure of FIGURE 1 and illustrates steps in the production of the device.

In order to understand how a practical device pellet is constructed and how the device may be constructed on the same production lines as a conventional SCR reference should be made to FIGURES 2 and 3. The pellet 20 illustrated in FIGURE 2 is for a conventional SCR and that of FIGURE 3 is for the remote gate device of FIGURE 1. The same reference numerals are used for corresponding parts (layers or regions) of the pellets in all three figures in order to simplify the drawings and description and to facilitate comparison. Actually the pellets are first formed in a larger wafer and cut out but the steps are the same as described here.

The pellet 20 is made starting with silicon of N conductivity type having a resistivity of 10 to 50 ohm-centimeters (impurity concentration of about $2.5 \times (10)^{14}$ atoms/cc.) that ultimately forms the internal N type base layer 11. The initial pellet 20 is rectangular with dimensions of 60 mils by 70 mils and has a thickness of approximately 8.5 mils and the pellet 20 is gallium diffused to a depth of about 2.2 mils so that P conductivity layers are formed on both sides of the N type layer 11. The P type layer on one side ultimately forms part of the internal P type base layer 12, and the other P type layer so formed ultimately forms the upper P type emitter layer 13. As shown, for the conventional SCR, the internal P type base layer 12 is the layer to which a gate lead is ultimately attached.

To complete the pellet 20 of FIGURE 2, the pellet is masked on both sides with, for example, silicon dioxide 21. A portion of the oxide mask is removed from the lower major face of the pellet to expose a portion of the lower P type layer 12 about 35 mils by 70 mils and the pellet is phosphorous diffused to a depth of approximately 1.1 mils to form the lower N conductivity type emitter 22. The oxide masking 21 is then removed and appropriate contacts formed by conventional means.

To complete the pellet of FIGURE 3, the pellet is masked (see silicon dioxide layer 21 on lower surface) in such a manner that one surface (the upper surface as illustrated) is completely exposed and a portion of the lower surface (approximately 25 mils by 70 mils) is exposed. The pellet is then phosphorous diffused to a depth of about 1.1 mils to form the upper N type emitter layer 14 and lower N type gate layer 17. Again, appropriate contacts (15, 16 and 18 of FIGURE 1) are applied by conventional techniques.

The attachment of the contacts 15, 16 and 18 may be done in any one of a number of conventional ways. The gate and anode contacts 16 and 17 have been made very successfully by attaching 10 mil diameter aluminum wire with an ultrasonic welder. The lower anode contact 15 has been made by flowing gold on the silicon and mounting it down to a Kovar header (not shown). Any conventional package may be used.

Devices constructed in this manner had peak reverse voltages forward breakover voltages in excess of 200 volts and the gate current required to trigger them was from 60 microamperes at 0.5 volt base drive to 500 microamperes at 0.6 volt.

Figure 4:
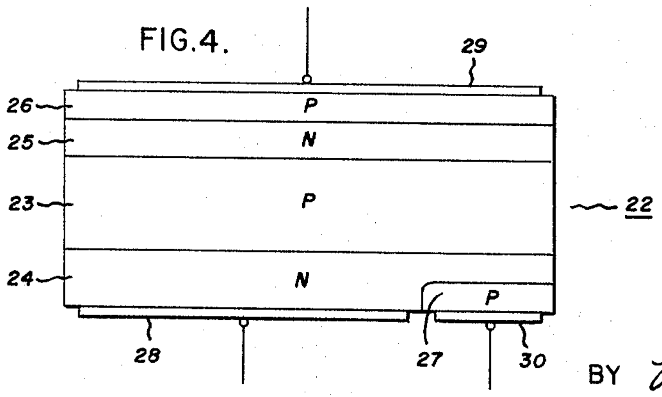
FIGURE 4 is a diagrammatic sectional view of a remote gate switch which constitutes the dual or complementary structure of the device of FIGURE 1.

The dual (or complementary structure) of the structure of FIGURE 1 is illustrated in FIGURE 4. By "dual" we mean that the structure is identical but the conductivities of the corresponding regions of the two devices are opposite and the anode and cathode contacts are on opposite sides of the devices.

These devices may be made by similar techniques and the same general principles apply. Therefore, an elaborate discussion of the operation and structure of the dual is not given here. However, it is noted that to make this device, the initial wafer or pellet 22 is of P conductivity type material which ultimately forms the internal P type base region 23. The N type emitter region 24 and internal N type base region 25 are diffused by a series of steps as described relative to regions 12 and 13 of the device of FIGURE 3, but, of course, N type impurity (such as phosphorous) is used. Finally, the P type emitter layer 26 and N type gate layer 27 may be diffused in by boron diffusion. Contacts are then applied by conventional techniques. For this structure, lower contact 28 is considered the cathode and upper emitter contact 29 is the anode. The contact 30 to the gate layer 27 is, of course, the gate contact.

It is obvious that the many minor modifications in the structure and means of obtaining the structure can be proposed while not departing from the present invention. For example, the internal base region 11 described as the starting material need not be the initial bulk material although this method does allow the device to be made on existing production lines without major changes. The initial material may be masked while the lower emitter layer is formed and then the internal base layer 11 can be formed. Thus, while particular embodiments are illustrated and particular methods of forming these embodiments are described, the invention is not limited thereto. It is contemplated that the appended claims will cover such modifications as fall within the true spirit and scope of the invention.

What we claim as new and desire to secure by Letters Patent of the United States is:

1. A semiconductor switching device capable of being switched between a normally high impedance state and a low impedance state by application of a switching voltage including in combination, A. a body of semiconductor material having
   (a) four regions of one and the opposite conductivity type interleaved to define three pn junctions therebetween, B. a pair of main current carrying electrodes each in low resistance ohmic contact with one of the external regions of said four regions whereby a main current path is provided through said four regions and three PN junctions and only one of said junctions is reverse biased for a vlotage of one polarity applied between said pair of main current carrying electrodes,
   (a) said pair of main current carrying electrodes having major portions directly opposite each other whereby a major component of said device main current path is substantially perpendicular to said three PN junctions, C. a fifth region of opposite conductivity type formed in one of said external regions of said body of semiconductor material and remote from the main current carrying electrode in ohmic contact therewith,
   (a) said fifth region forming a gate pn junction with the adjacent external region and providing transistor action with the next adjacent one of said three pn junctions and D. a third electrode in low resistance ohmic contact with said fifth region thereby to form a gating electrode for the semiconductor switching device whereby said switching device is switched to its low impedance state upon application of a voltage to said third electrode which is between that applied across the main current carrying electrodes.

2. A semiconductor switch as defined in claim 1 wherein said fifth region is of n type conductivity.

3. A semiconductor switch as defined in claim 1 wherein said fifth region is of p type conductivity.

References Cited by the Examiner

UNITED STATES PATENTS

| | | | |
|---|---|---|---|
| 2,936,384 | 5/1960 | White | 317—235 |
| 2,959,504 | 11/1960 | Ross et al. | 317—235 |
| 3,023,347 | 2/1962 | Strull | 317—235 |
| 3,123,750 | 3/1964 | Hutson et al. | 317—235 |
| 3,217,378 | 11/1965 | Reuschel et al. | 317—235 |

JOHN W. HUCKERT, *Primary Examiner.*

R. F. POLISSACK, *Assistant Examiner.*

Disclaimer 3,284,680.—*Finis E. Gentry*, and *Bernard R. Tuft*, Skaneateles, N.Y. SEMICONDUCTOR SWITCH. Patent dated Nov. 8, 1966. Disclaimer filed Aug. 15, 1972, by the assignee, *General Electric Company*.

Hereby enters this disclaimer to claims 1, 2 and 3 of said patent.

[*Official Gazette September 19, 1972.*]